Sept. 5, 1944.  A. F. RANDALL  2,357,548
TRUCK
Filed April 18, 1940  2 Sheets-Sheet 1
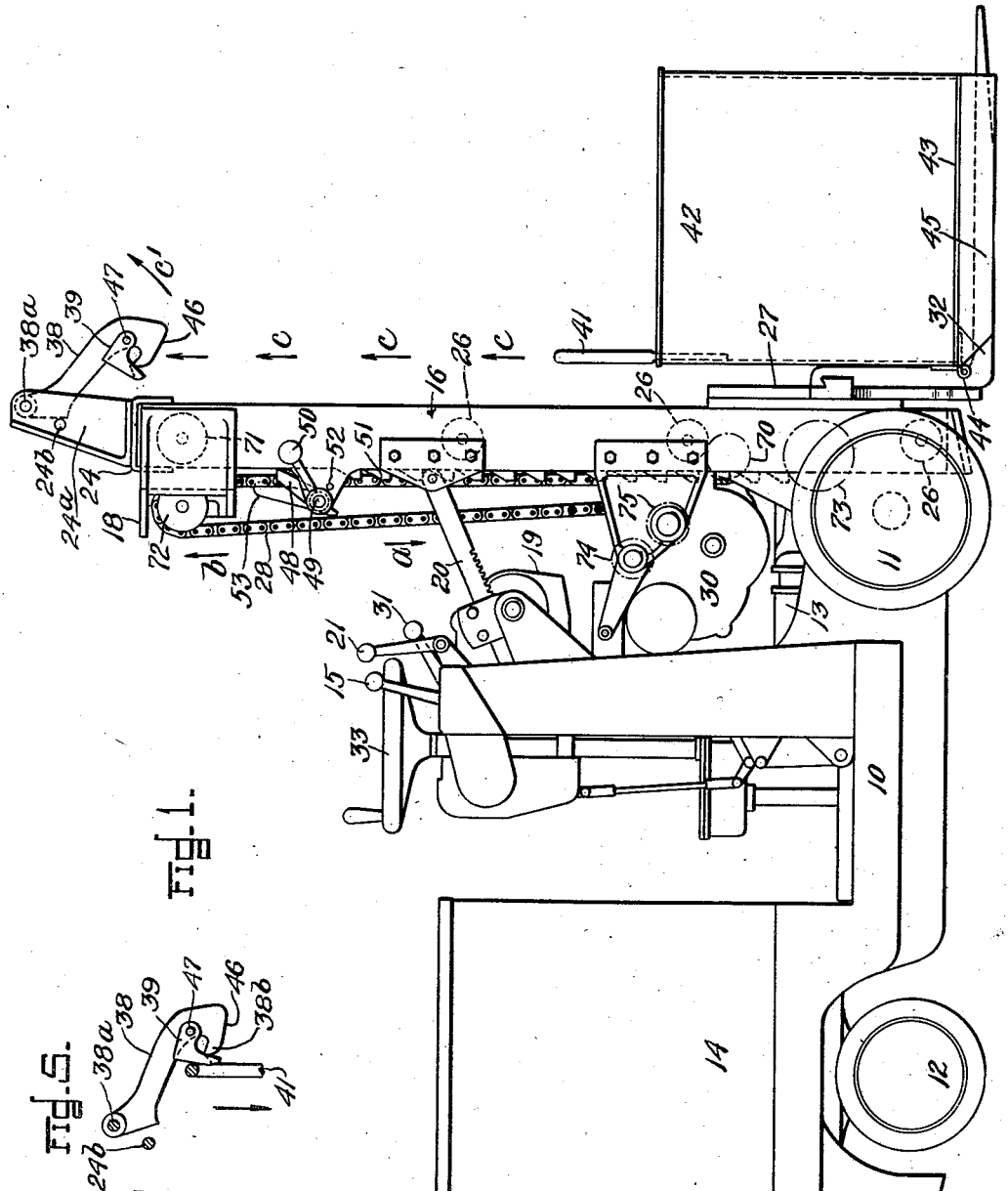
INVENTOR.
Arthur F. Randall

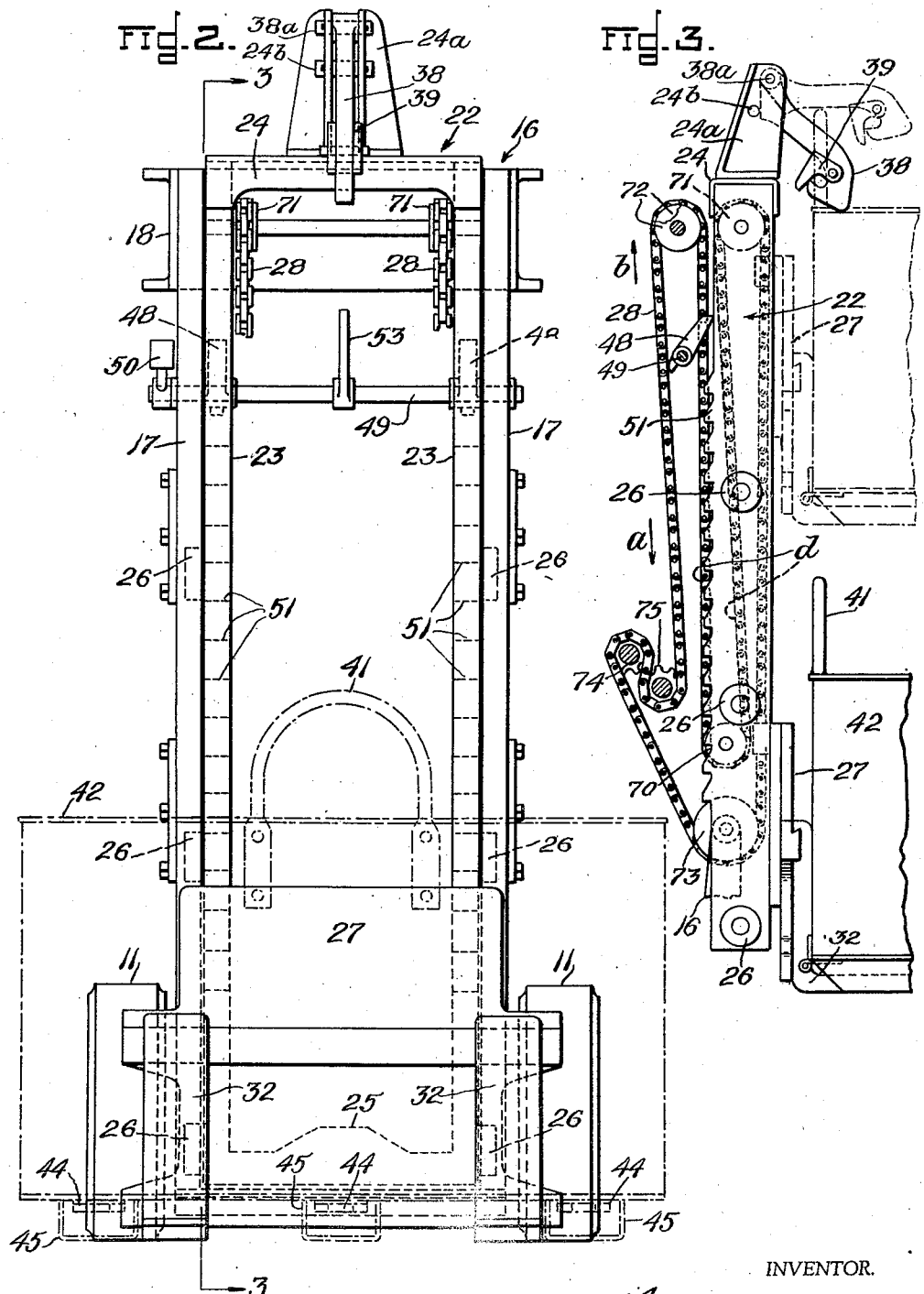

Patented Sept. 5, 1944

2,357,548

UNITED STATES PATENT OFFICE 2,357,548

TRUCK

Arthur F. Randall, Boston, Mass., assignor, by mesne assignments, of three-tenths to Charlotte E. Wilson, Brookline, and seven-tenths to Adelaide P. Cotter, Boston, Mass.

Application April 18, 1940, Serial No. 330,338

8 Claims. (Cl. 214—117)

This invention relates to self-propelled trucks, such as are employed in warehouses, shops and other places for moving about and handling heavy material and objects, and has particular reference to trucks of this class adapted to handle dumping buckets. The invention also contemplates improvements in the dumping mechanisms of trucks of this class.

The invention has for its object to provide an improved truck of the class indicated which will be particularly constructed so that it can be operated to pick up, transport and dump loaded buckets.

To this end I have provided an improved motor propelled and operated truck of the character described having the features of construction and mode of operation set forth in the following description, the several novel features of the invention being separately pointed out and defined in the claims at the close of the description.

In the accompanying drawings:

Figure 1 is a side elevation of a motor propelled truck equipped with bucket handling mechanism constructed in accordance with this invention.

Figure 2 is a front elevation of the machine shown in Fig. 1.

Figure 3 is a partial section on line 3—3 of Fig. 2.

Figures 4 and 5 illustrate the operation of the latch or grappling hook hereinafter described.

The truck illustrated in the accompanying drawings comprises a chassis 10 supported by a pair of front wheels, one of which is shown at 11, and a pair of dirigible rear wheels, one of which is shown at 12, the front wheels being driven by an electric motor 13 which is controlled by the operator who stands upon the chassis 10 immediately in front of the usual battery compartment 14. One of the controllers through which the operator starts, stops and reverses driving motor 13 is shown at 15.

At the front of chassis 10 is pivotally supported an upstanding rectangular main frame 16 including two spaced apart relatively parallel side channels 17 which are disposed with their flanges innermost, the upper ends of said channels being rigidly connected by a head or cross bar 18. The lower ends of the channels 17 are pivotally connected with the chassis so that the frame 16 can be swung fore and aft on a transverse axis by means of an electrically driven tilting unit 19 that is connected with frame 16 by rack bars 20 and which is controlled by the operator through the medium of a control member 21.

Between the channels 17 of main frame 16 is arranged a supplemental extension frame (Fig. 2) comprising oppositely disposed side channels 23 connected at their upper ends by a cross bar 24 and at their lower ends by a cross bar 25. The channels 23 of this supplemental extension frame are provided upon their outer sides with rollers 26 occupying positions between the flanges of the channels 17 of the main frame 16 so that the inner supplemental frame 22 can be moved up and down relatively to the outer main frame and so that it is guided in its movement by the rollers.

Slidably mounted upon the front side of the inner supplemental frame 22 is a load-supporting carriage 27 to which the opposite ends of chain cables 28 (Fig. 1) are connected as usual so that when said chains are operated in one direction carriage 27 is moved upwardly relatively to the inner supplemental frame 22 and when said chains are moved in the opposite direction the carriage is lowered.

The chains 28 extend around the usual sprockets and sheaves, two of which, 70 and 71, are carried by the inner supplemental frame 22 and the others, 72, 73, 74 and 75, by the outer main frame 16. The sprockets 74 and 75 form part of an electrically operated hoist unit 30 which is controlled by the operator through the medium of a handle or control member 31.

The carriage 27 is equipped with a pair of angular tines 32 which are mounted on the carriage 27 with provision for adjustment toward and from each other as may be required for the particular load to be carried. The carriage 27 with its tines 32 is usually referred to as the fork of the machine and, as shown in Fig. 1, each tine is made with a forwardly extending portion that is adapted to be slid or moved into position beneath the load that is to be carried, through forward movement of the vehicle or truck.

While the truck is traveling from one point to another the operator directs its course by means of a steering wheel 33 connected through the usual mechanism with the rear dirigible wheels 12.

When the carriage 27 occupies its lowermost position as shown in Fig. 1, and movement of chains 28 is occasioned in the direction of the arrow a, the said carriage 27 is moved upwardly relatively to main frame 16 and the inner supplemental frame 22 until carriage 27 reaches and engages the usual abutments at the upper end of supplemental frame 22 after which continued movement of chains 28 in the direction of arrow a raises both supplemental frame 22 and carriage 27 in unison. In other words, the framework of the hoisting apparatus is extensible and is extended after carriage 27 arrives at the top of supplemental frame 22 and occupies the position shown by broken lines in Fig. 3, if the movement of chains 28 is continued.

When chains 28 are operated in the direction indicated by the arrow b (Fig. 1) after the hoisting apparatus has been extended, carriage 27 and supplemental frame 22 are lowered in unison until the supplemental frame is arrested by the usual down stops therefor, after which continued movement of the chains slides the carriage 27 downwardly on supplemental frame 22 until it arrives at its lowermost position shown in Fig. 1.

When carriage 27 and the inner supplemental frame 22 occupy their lowermost positions as shown by full lines in the drawings, the sheaves 71 which are disposed adjacent to the upper end of the supplemental frame are alongside of the sheaves 72 on the main frame and a loop d formed in each chain extends downwardly from sheaves 71 and 72 and around sheave 70 carried by the inner supplemental frame adjacent to the lower end of the latter. One side of this loop extends upwardly from its sheave 70 around its sheave 71 and thence downwardly to carriage 27 where it is fastened. The other side of this loop extends upwardly from its sheave 70 around its sheave 72 and thence downwardly to the driving sprockets 74 and 75. Each chain passes around its sprocket 75 and its sprocket 74 and from the latter it extends downwardly around a sheave 73 on the outer main frame and thence upwardly to a point where its end is fastened to carriage 27.

When each chain is driven in the direction of the arrow a to raise a loaded bucket the weight of the latter is borne by the inner supplemental frame so that the latter remains in its lowermost position until the carriage 27 engages the stop abutment at the upper end of the inner supplemental frame. Thereafter, continued operation of each chain in the direction of the arrow a takes up on the loop d thereby acting through sheave 70 to move the inner supplemental frame upwardly until its movement in that direction is arrested by the usual stop adjacent to the upper end of the outer main frame.

When the bucket thus elevated is to be lowered, and assuming that the inner supplemental frame is not locked in its uppermost extended position as hereinafter described, the chains 28 are driven in the direction of the arrow b (Fig. 3) and the sheaves 70 and the inner supplemental frame will be lowered in unison with the carriage 27 through lengthening of the loop d until the downward movement of the inner supplemental frame is arrested by the usual down stop. Thereafter, continued movement of each chain in the direction of the arrow b will lower carriage 27 from the position shown by broken lines in Fig. 3 to its lowermost position shown by full lines in said figure.

The above details of construction and operation are as heretofore and my present invention contemplates improving the hoisting apparatus or mechanism in order to adapt the same to handle and operate dumping buckets or the like.

To this end I provide a latch or grappling hook 38 which is pivotally mounted at 38a between upstanding brackets 24a forming rigid parts of the top cross bar of supplemental frame 22. This grappling hook hangs loosely on its pivot 38a and normally rests by gravity against a stop bar 24b forming part of the brackets 24a, with its lower free end occupying a position in the path of the intermediate portion of a bail 41 forming part of a bucket 42. This intermediate portion of the bail 41 provides a transversely disposed bar which is approximately parallel with the axis of the hook pivot 38a and adapted, at times, to engage the hook 38 and a cam shield 39 pivotally mounted on said hook.

The bucket or load-holding member 42 is provided with a bottom wall 43 which is hingedly connected at 44 with one of the side walls of the body portion of the bucket. Bolsters 45 provided upon the bottom side of the bottom wall 43 support the latter above the level of the ground so that the tines 32 of the fork can be moved into and out of position beneath the bottom wall while the bucket rests upon the ground.

After the vehicle has been manipulated to position the tines 32 beneath a loaded bucket the chains 28 are operated to raise the carriage and bucket far enough to lift the latter away from the ground and then the vehicle is operated to transport the bucket to its destination. If the bucket occupies a position below and out of engagement with hook 38 and is to be dumped without extension of the hoist frame, then chains 28 are again operated in the direction of the arrow a to move the bucket upwardly, and during this upward movement of the bucket the bail 41 traverses the path indicated by the upwardly pointed arrows c in Fig. 1, and through engagement with a cam surface 46, provided at the lower free end of hook 38, it swings the latter laterally and upwardly in the direction of the arrow d until the bail rides off of cam 46 and swings cam shield 39 upwardly (Fig. 4) whereupon the shank portion of hook 38 falls by gravity into position against the bail 41 and further upward movement of the bucket is stopped. The chains 28 are now operated in the direction of the arrow b (Fig. 1) to lower the bail into the crotch of the hook 38 which stops further downward movement of the body of the bucket with the result that continued downward movement of carriage 27 permits the bottom wall 43 of the bucket to open and dump the contents of the latter.

In order to free the empty bucket from hook 38 and lower the same to the ground, the chains 28 are moved in the direction of the arrow a (Fig. 1) until the bucket occupies the broken line position shown at the top of Fig. 3 whereupon the direction of movement of the chains is reversed and the bucket is lowered to the ground without interference from the hook. During the first part of the movement of the bucket downwardly from the broken line position shown in Fig. 3, the hook 38 swings downwardly until the cam shield 39 rests against the side of bail 41 after which the bail slides downwardly on the cam shield, as shown in Fig. 5, past the nose 38b of the hook.

If the bucket is to be dumped at such a height as to require extension of the hoist frame, then the movement of chains 28 in the direction of the arrow a is continued after carriage 27 reaches the upper end of the supplemental frame 22 and occupies the position indicated by broken lines at the top of Fig. 3 which results in upward movement of said frame and hook 38 with carriage 27 and the bucket. When the chains 28 are stopped with the hoist frame thus extended, the supplemental frame is locked in its elevated position while the chains 28 are operated first in one direction and then the other thereby to raise and lower carriage 27 and the bucket as required to first engage the bail with hook 38 and dump the bucket and thereafter to free the bail from the hook and lower the bucket.

In the illustrated embodiment of the invention the means or mechanism for locking the supplemental frame in its elevated position while carriage 27 is being raised and lowered to engage the bail with the hook, to dump the bucket, and to free the bail from the hook, comprises two pawls 48 fixed to the opposite ends of a horizontal transversely disposed shaft 49 journaled in bearings on main frame 16. This shaft is provided with a weighted arm 50 through which gravity acts to hold the pawls 48 yieldingly against the side channels 23 of the supplemental frame 22. Each of these side channels 23 is made upon the exterior of its rear flange with a longitudinal rack of teeth 51 to co-operate with one of the pawls 48 and it will be clear that while the supplemental frame is being raised to extend the hoist frame as above described, the pawls 48 trail on the racks 51 and act automatically to lock the supplemental frame in its elevated position while carriage 27 is being raised and lowered to dump a bucket.

When, after dumping a bucket, it is desired to lower the supplemental frame, the pawls 48 are swung rearwardly away from side channels 23 where they are supported in inoperative positions by a stop 52 (Fig. 1) on main frame 16.

Shaft 49 may be provided at its middle with an arm 53 (Figs. 1 and 2) for use by the operator in manually shifting the pawls into and out of operative positions.

The cam shield 39 is in the form of a yoke whose legs are disposed upon opposite sides of, and pivotally connected at 47 with, the hook member 38 while the intermediate portion of the yoke is adapted to rest upon the nose of the hook while the shield occupies its normal position and to abut the shank portion of member 38 when said shield occupies a position at the limit of its upward swinging movement relatively to said member. Thus, when the bail 41 is to be disengaged from the hook after dumping the bucket, the carriage 27 is caused to move upwardly so that at first the bail raises shield 39 into position against the shank of member 38 and thereafter acts through said shield to swing member 38 upwardly and outwardly until the lateral swinging movement of member 38 carries the shield 39 out of engagement with the bail whereupon the shield falls by gravity into position against the nose of the hook. It will be clear that as soon as the shield falls into this position the carriage can be moved downwardly thereby lowering member 38 until the bail 41 engages the shield. Continued downward movement of carriage 27 causes the bail to ride downwardly on the exposed cam side of shield 39 thereby swinging member 38 outwardly to some extent until the bail clears the lower end of shield 39 whereupon member 38 returns by gravity to its normal position where it is supported by the cross bar 24b.

While I prefer the dumping member or hook 38, constructed and operating as described, it will be clear that other types of hooks may be substituted, if desired.

What I claim is:

1. An automotive truck of the class described having in combination an upstanding main frame disposed at one end of the vehicle; a single supplemental extension frame mounted on the main frame for movement up and down thereon; a carriage mounted on said supplemental extension frame for movement up and down thereon; a bucket supported by said carriage; mechanism operable to move said carriage upwardly on said supplemental frame into a position adjacent to the upper end of the latter and to thereafter move both said carriage and said supplemental frame in unison upwardly relatively to said main frame; means adjustably mounted on said main frame adapted to support said supplemental extension frame in the position to which it is elevated by said carriage, and mechanism on said supplemental extension frame operable to automatically engage said bucket to cause the same to dump its load when said carriage is operated by said carriage moving mechanism while said supplemental extension frame is held in said elevated position by said supporting means.

2. An automotive truck of the character described having in combination, an upstanding main frame disposed at one end of the vehicle, a single supplemental extension frame mounted on said main frame for movement up and down relatively thereto, a carriage movable up and down on said supplemental extension frame and providing a seat for a bucket, mechanism for raising and lowering said carriage, said mechanism being operable to move said carriage upwardly on said supplemental extension frame to the upper end of the latter and thereafter to move both said carriage and said supplemental extension frame in unison upwardly relatively to said main frame, a bucket seated on said carriage, means for locking said supplemental extension frame to said main frame after it has been elevated by said carriage, and a bucket-dumping latch member movably mounted on said supplemental extension frame in position to automatically engage said bucket to cause the same to dump its load when said carriage is lowered relatively to said supplemental extension frame while the latter is locked in its elevated position.

3. An automotive truck comprising bucket hoisting and dumping apparatus including, in combination, a main frame disposed at one end of the vehicle and extending upwardly therefrom; a single supplemental frame mounted on said main frame for movement up and down relatively thereto, said supplemental frame being made with a series of shoulders; a carriage movable up and down on said supplemental frame and providing a seat for a bucket; power-operated mechanism operable to move said carriage upwardly on said supplemental frame to the upper end of the latter and to thereafter move the carriage and supplemental frame in unison upwardly relatively to said main frame; means on said main frame engageable with one of said shoulders to lock said supplemental frame in its elevated position; a bucket seated on said carriage having a bottom wall hingedly connected with the body thereof, said bottom wall being supported in closed position by said seat, and a bucket-dumping member movably mounted on said supplemental frame in position to engage the bucket when said carriage occupies a position adjacent to the upper end of said supplemental frame thereby to support the body of said bucket when said carriage is lowered while said supplemental frame is locked in its elevated position thereby to dump the contents of the bucket.

4. An automotive truck comprising bucket hoisting and dumping apparatus including, in combination, a main frame disposed at one end of the vehicle and extending upwardly therefrom; a single supplemental frame mounted on said main frame for movement up and down relatively thereto; a carriage movable up and down on said supplemental frame and providing a seat for a bucket; power-operated mechanism operable to move said carriage upwardly on said supplemental frame into a position adjacent to the upper end of the latter and to thereafter move said carriage and supplemental frame in unison upwardly relatively to said main frame; a bucket seated on said carriage having a bottom wall hingedly connected with the body thereof, said bottom wall being supported in closed position by said seat; a bucket-dumping member movably mounted on said supplemental frame in position to engage the bucket when said carriage occupies a position adjacent to the upper end of said supplemental frame thereby to support the body of said bucket when said carriage is lowered to dump the contents of the bucket, and means for locking said supplemental frame in its elevated position while said carriage is being shifted on said supplemental frame to engage the body of the bucket with said member and thereafter dump the contents of the bucket.

5. An automotive truck comprising bucket hoisting and dumping apparatus including, in combination, a main frame disposed at one end of the vehicle and extending upwardly therefrom; a single supplemental frame mounted on said main frame for movement up and down relatively thereto; a carriage movable up and down on said supplemental frame and providing a seat for a bucket; power-operated cable mechanism of the character described operable to move said carriage upwardly on said supplemental frame to a position adjacent to the upper end of the latter and to thereafter move said carriage and supplemental frame in unison upwardly relatively to said main frame; a gravity pawl pivotally mounted on said main frame and cooperating with a rack of teeth provided on said supplemental frame to automatically lock the latter in its elevated position, said rack of teeth being disposed parallel with the direction of movement of said supplemental frame relatively to said main frame; a bucket seated on said carriage having a bottom wall hingedly connected with the body thereof, said bottom wall being supported in closed position by said seat, and a bucket-dumping grappling hook movably mounted on said supplemental frame adjacent to the upper end of the latter and in position to separably engage the bucket body when said carriage occupies a position adjacent to the upper end of said supplemental frame thereby to support said body when said carriage is lowered relatively to the supplemental frame to dump the contents of the bucket.

6. In an automotive truck of the class described, the combination with the single supplemental extension frame thereof; a carriage movable up and down on said supplemental extension frame, a load-holding member supported by said carriage, and cable mechanism for operating said carriage and supplemental extension frame as described, of means for locking said supplemental extension frame in an elevated position into which it is moved by said cable mechanism acting through said carriage, and a grappling hook mounted on said supplemental extension frame for automatically engaging said load-holding member to cause the same to dump its load when said carriage is lowered relatively to said supplemental extension frame while the latter is locked in elevated position.

7. The combination of claim 4 wherein said member consists of a grappling hook and wherein a cam shield is provided which is movably mounted on said grappling hook in position to control the action thereof so that said bucket is automatically engaged by said hook to dump said bucket by upward and downward movement of the carriage and bucket relatively to said supplemental extension frame while the latter is locked in elevated position and so that said bucket is thereafter automatically freed from said grappling hook by upward movement of said carriage and bucket relatively to said supplemental extension frame preparatory to lowering the latter, said carriage and said bucket.

8. The combination of claim 1 wherein said bucket is made with a bail to co-operate with said grappling hook and wherein said grappling hook is provided with a movably supported cam shield normally held by gravity in position to close the entrance to said hook but adapted to be moved aside by said bail to permit the latter to enter said hook when said bail is first raised to a predetermined relatively low height and then lowered while said supplemental frame is locked in its elevated position thereby to cause said hook to engage and support said bail and bucket, and said shield being also adapted to move into entrance-closing position when said bail is thereafter raised out of said hook to a greater predetermined height and then lowered relatively to said hook and shield, thereby to permit said bail to pass downwardly beyond said grappling hook without being caught by the latter.

ARTHUR F. RANDALL.